United States Patent
Romine et al.

(10) Patent No.: US 6,234,358 B1
(45) Date of Patent: May 22, 2001

(54) FLOATING HEAD LIQUID DISPENSER WITH QUICK RELEASE AUGER CARTRIDGE

(75) Inventors: Michael J. Romine, Escondido; Alan R. Lewis, Carlsbad, both of CA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 09/436,297

(22) Filed: Nov. 8, 1999

(51) Int. Cl.$^7$ .................................................. B67D 5/06
(52) U.S. Cl. ..................... 222/181.3; 222/413; 222/333
(58) Field of Search .................................. 222/413, 411, 222/378, 372, 333, 181.3, 504; 118/410, 302; 239/280.5, 283, 587.1

(56) References Cited

U.S. PATENT DOCUMENTS

| | | | |
|---|---|---|---|
| 4,778,080 | * 10/1988 | Ono et al. | 222/413 |
| 5,553,742 | * 9/1996 | Maruyama et al. | 222/413 |
| 5,564,606 | 10/1996 | Engel | 222/261 |
| 5,971,227 | * 10/1999 | White et al. | 222/413 |
| 5,984,147 | 11/1999 | Van Ngo | 222/240 |

* cited by examiner

Primary Examiner—Kevin Shaver
Assistant Examiner—Patrick Buechner
(74) Attorney, Agent, or Firm—Wood, Herron & Evans, L.L.P.

(57) ABSTRACT

An auger type liquid dispenser accommodates floating head operation by using a floating coupling along the dispensing axis between the motor drive shaft and a pump body coupling which holds the dispensing auger within the pump body in alignment with the dispensing axis, the floating coupling being variable in axial dimension to accommodate relative axial movement between the pump body coupling and the drive shaft during "floating head" dispensing. An auger cartridge removably connects to the pump body via a quick release engagement lever which radially and axially holds the auger cartridge relative to the pump body. This structure facilitates torque transmission to the auger while reducing wear, and the quick release lever facilitates connection to and disconnection from the valve body. The dispenser flowpath includes a frustoconically shaped transition portion residing adjacent the inlet to promote liquid flow without clogs. A linear bearing operatively connects the "floating" pump body to a mounting surface which is parallel to the dispensing axis, to promote smoother "floating" and reduced friction.

25 Claims, 5 Drawing Sheets

FLOATING HEAD LIQUID DISPENSER WITH QUICK RELEASE AUGER CARTRIDGE

FIELD OF THE INVENTION

This invention relates to auger type liquid dispensers, and more particularly to auger type liquid dispensers used in a "floating" head mode to affect high speed, high precision deposition of liquid, such as solder paste, on a substrate, with a high degree of repeatability.

BACKGROUND OF THE INVENTION

In the high speed dispensing, or pumping, of precise amounts of liquid for deposition on a substrate, it is common to use an auger, or screw, dispenser. Use of an auger dispenser helps achieve a high degree of repeatability and control of the liquid being dispensed. These features are important because of the high speed nature of this deposition process. For instance, in depositing "drops" of solder paste on a substrate, for some applications it is necessary to dispense at a rate of 25,000 dots per hour, or just less than seven dots per second. Under these conditions a high degree of liquid control is necessary in order to achieve sufficient repeatability and accuracy in deposition.

In an auger dispenser, an auger is held within a pump body. The auger extends along an axial flowpath for the liquid to be dispensed, with an outlet end of the auger located adjacent an exit port of the flowpath and an opposite, drive end of the auger held by and rotatably driven by a coupling, which operatively connects to a drive motor via a drive shaft motor. The pump body has an inlet in fluid communication with the flowpath, and a liquid supply line supplies dispensing liquid to the flowpath. Initially, liquid is supplied to the flowpath under pressure, to fill the flowpath along the length of the auger, and then the pressure is reduced to a lower operating level. Thereafter, incremental rotations of the drive motor cause rotation of the auger, thereby producing drops of liquid, such as solder paste, to flow from the exit port for deposition on a substrate.

In some instances, angular rotation of the motor drive shaft of about $\frac{1}{16}$th of a full rotation results in a drop of liquid exiting from the exit port. With movement of the substrate relative to the exit port of the dispenser, which is usually held in a fixed position relative to the travel path of the substrate, discrete successive partial rotations of the motor shaft, and the auger coupled thereto, results in repeated deposition of drops of liquid on the substrate.

In one prior version of an auger dispenser of this type, the structural components of the pump body, including the components which hold the auger, are held together by bolts and set screws, to promote rigidity and stability during use. While this structure itself has proved quite suitable for dispensing applications, the disassembly of the structure for cleaning purposes can be time consuming and tedious. This results in greater downtime for the dispenser and lower overall throughput for the dispenser.

In a different, but prior version of an auger dispenser used for similar applications, the auger resides within a cartridge which removably connects to the remainder of the pump body, or dispenser structure, via radial movement of a threaded, manually operable set screw which threads radially into position from the pump body to engage an axially oriented slot in the exterior of the cartridge. The axial orientation of the slot enables the set screw to move axially, so that the connected cartridge and the auger held therein are axially movable relative to the remainder of the dispenser structure, including the coupling.

Even with this removable cartridge structure, connection and disconnection of the cartridge requires manual rotation of the set screw to engage or disengage the slot. Moreover, the axial slot formed in the cartridge necessarily permits axial movement of the cartridge and the auger relative to the other pump components, a structural arrangement which is suitable for "floating head" dispensing, wherein the pump body moves to and from the substrate and actually contacts the substrate.

Because there are some applications for auger dispensers wherein the dispensing head does not "float," i.e. wherein the cartridge, the auger and the rest of the pump components may remain axially fixed, there are thus applications where this relative movement between the coupling and the auger is unnecessary. Even for floating head operation, axial movement of the auger relative to other pump components may not be desirable, for the reasons described below.

In "floating head" deposition of liquid on a substrate, the pump body moves toward the substrate until a standoff, carried by the pump body, contacts the substrate. Liquid dispensing is correlated to contact between the standoff and the substrate. This occurs repeatedly during liquid deposition. The pump body is moved toward the substrate, a liquid drop is deposited on the substrate, and then the pump body moves away from the substrate.

The pump body carries the standoff, and the other pump components carried by the body also move to and from the substrate, including the auger. However, when this structure contacts the substrate, as is typical during "floating head" operation, some structure along the dispenser axis must absorb this impact. This usually means that the coupling structure, which operatively connects the drive shaft to the auger, must accommodate relative movement along the axis of dispensing, and also must repeatedly absorb the impact with the substrate. Typically, the coupling is housed with the pump body and includes an axially elongated keyway sized to coact, or receive, an end of the auger, thereby to transmit torque thereto relative to the dispensing axis and to accommodate axial movement of the auger relative to the coupling.

In some instances, the coupling may actually be rotating and transmitting torque to the auger while the auger is moving axially, relative to the coupling, and during contact of the pump body with the substrate. This presents several problems. The surface to surface contact between the auger and the coupling generates wear, and can even result in the grinding away of small particles. These particles can get into the dispensing liquid. Also, because of the need for the coupling and the auger to accommodate relative axial movement therebetween, during manufacture both must be machined with longer clearances. These greater clearances result in less-effective torque transmission to the auger. Moreover, if relative axial movement occurs during torque transmission, the auger may bind somewhat within the coupling, which causes excessive surface to surface wear and/or may inhibit axial movement. This can also result in excessive impact force to the substrate. Because of the need for high speed, high precision and a high degree of repeatability in some liquid dispensing applications, as for instance the deposition of solder paste on a substrate, these disadvantages are not acceptable.

In typical floating head dispensers, the dispensing head (which in this case includes the pump body) is movable relative to the rest of the pump due to the use of a slide bearing, with the slide bearing including a bushing surrounding, or at least engaging, the pump body fairly close to the dispensing axis. With these structures, to minimize excessive wear it is necessary to increase the clearance for the bearing surfaces. However, the increased clearances inevitably result in a less precise movement of the pump body toward and away from the substrate. On the other hand, reducing the clearance would produce an increase in wear due to surface to surface contact between the pump body and the bearing.

In addition to these concerns relative to "wear" and clearance, with these dispensers it is also important to keep in mind that overall efficiency in operation, i.e. decreased downtime and increased throughput, can be achieved only if the components can be assembled and disassembled relatively quickly and easily.

Also, certain liquids dispensed by pumps of this type, such as solder paste, may require special handling considerations. For instance, solder paste is sensitive to changes in fluid directional flow. Such directional changes may cause the solder to cold weld in place, thereby clogging the dispenser.

It is an object of this invention to reduce the magnitude of impact forces applied to a substrate and the wear which results from axial movement of a pump body of a floating head auger pump, without sacrificing precision or repeatability in liquid dispensing.

It is another object of the invention to improve the torque transmission between a drive shaft and an auger for a floating head auger dispenser, without increasing wear between components.

It is still another object of the invention to further improve the precision and repeatability of liquid dispensing for an auger dispenser, without compromising simplicity in design and without sacrificing convenience relative to assembly and disassembly of the dispenser components, while also minimizing the occurrence of cold welding of the liquid being dispensed.

SUMMARY OF THE INVENTION

The present invention achieves the above-stated objects by using a floating coupling between the drive shaft and the pump body of an auger dispenser, so that a pump body coupling, or drive coupling, can remain substantially fixed in axial position relative to the auger during dispensing in a "floating" mode. The floating coupling varies in axial dimension to accommodate the reciprocal movement of the pump body relative to the drive shaft and to absorb the impact shocks when the pump body repeatedly contacts the substrate. This floating coupling also minimizes the magnitude of impact forces applied to the substrate during "floating" operation.

During operation, with the pump body coupling and the auger substantially fixed relative to the auger axis, the wear which would otherwise result from surface to surface contact during axial reciprocation is eliminated, or at least substantially minimized. Also, due to the fixed axial positioning, the tolerance between these two components can be reduced, resulting in better torque transmission.

The present invention also achieves these objects via a linear bearing which operatively connects the pump body to a mounting surface which is parallel with the auger axis. This confines movement of the pump body to a linear travel path which is parallel with the axis, but spaced laterally away from the axis.

According to another aspect of the present invention, the above-stated objects are achieved via a liquid dispenser with a pump body, specifically a valve body, and an auger cartridge which removably connects thereto via a lever mounted to the valve body which is biased into engagement with the auger cartridge to hold the auger cartridge in a fixed position, radially and axially, relative to the valve body. Once the auger cartridge is connected to the valve body there is little or no axial play, or axial give, between the drive end of the auger and the drive coupling which operatively connects the auger to the drive shaft of the motor. Movement of the lever out of engagement with the auger cartridge permits easy disconnection of the auger cartridge from the valve body and also easy reconnection of the auger cartridge to the valve body.

The lever structure of this invention simplifies connection and disconnection of the auger cartridge to/from the valve body. This facilitates cleaning of the auger cartridge, when necessary, thereby minimizing down time and maximizing throughput for the dispenser.

The auger cartridge includes a housing and an auger residing inside the housing, the auger extending along an axial flowpath for the dispensing liquid. When the auger cartridge is connected to the valve body, one end of the auger operatively connects to the drive coupling which is retained at the end of the valve body, and an opposite end of the auger resides adjacent an outlet of the flowpath. Preferably, an inlet through the housing resides in fluid communication with the flowpath and includes a frustoconically shaped transition portion which has no abrupt right angle turns, thereby to minimize the possibility of cold welding, or clogging, occurring within the pump as dispensing liquid flows from the inlet to the outlet.

In a preferred embodiment, the invention contemplates the simultaneous advantages of the floating coupling, the linear bearing, the quick release auger cartridge and the frustoconically shaped transition portion within the flowpath. Relative to the first two of these features, the preferred embodiment of the invention contemplates a drive motor with a drive shaft, a floating coupling, a pump body coupling (or drive coupling), a pump body including an auger residing within an axial flowpath which terminates at an outlet, a linear bearing and a mount for the linear bearing. The floating coupling operatively connects the drive shaft of the drive motor to the pump body coupling along the axis. The pump body coupling holds the drive end of the auger and rotatably transmits torque thereto.

During dispensing the pump body coupling remains substantially fixed in axial position relative to the auger, with respect to the axis. The linear bearing operatively connects the pump body to a mount surface, the mount being movable on a frame to and from a substrate, along with other components. The linear bearing allows the pump body to move axially relative to the mount, but within a confined linear travel path, with the bearing components spaced laterally away from the dispensing axis.

Because of the structure of the linear bearing, tighter tolerances are achievable but with reduced wear, or friction. Thus, the possibility of minute wear particles being mixed with the deposited liquid is reduced.

As noted above, the preferred embodiment of the present invention further contemplates a pump body wherein an auger cartridge removably connects to the body. More specifically, the liquid dispenser includes a pump body, or valve body, with the pump body coupling, or drive coupling, located at a drive end and an auger cartridge connected within the opposite end, and the auger cartridge held in place radially and axially, relative to a dispensing axis, via a lever. The auger cartridge includes a housing with an axial flowpath therethrough and an auger residing along the flowpath. One end of the auger, referred to as a drive end, connects to the pump body coupling when the housing is connected to the valve body, while an opposite end resides adjacent an outlet of the flowpath. The housing also includes an inlet in fluid communication with the axial flowpath, with a frustoconically shaped transitional portion of the flowpath defined by angled internal walls of the housing, thereby to eliminate a 90 degree turn in the fluid flowpath for dispensing liquid flowing from the inlet to the outlet. The cross-sectional shape of this portion, in combination with a uniform diameter auger, helps the auger pull the liquid toward the outlet and minimizes clogs or cold welding due to sharp turns.

With this structure all parts of the dispenser which contact the dispensing liquid are part of the auger cartridge, and therefore are readily connectable to and disconnectable from the valve body. Because the lever structure securely holds the cartridge in a fixed radial and axial position relative to the valve body with respect to the dispensing axis, this quick release connection does not in any way compromise dispensing accuracy.

It will be appreciated by those skilled in the art that the quick release lever structure could be inverted, so that the housing carries the lever and the valve body includes a complementary shaped notch for engaging the lever when the auger cartridge is locked into position.

These and other features of this invention will be more readily appreciated in view of the drawings and the detailed description.

DETAILED DESCRIPTION OF THE DRAWINGS

Figure 1:
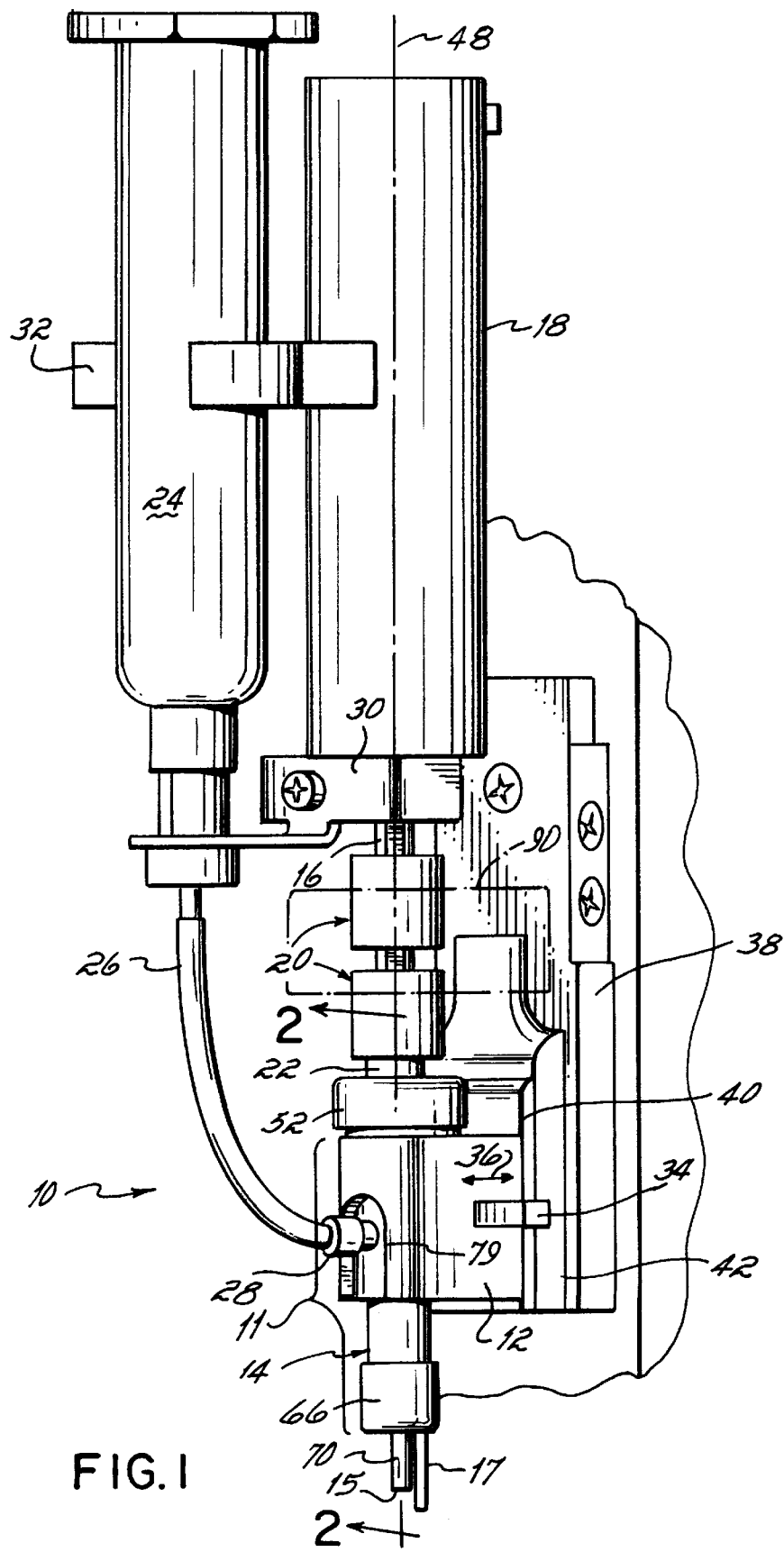
FIG. 1 is a perspective side view of a floating head liquid dispenser in accordance with a first preferred embodiment of the invention.

With reference to the Figures, a first preferred embodiment of a liquid dispenser 10, or liquid pump is shown, in accordance with the present invention. The liquid dispenser 10 includes a pump body or dispenser head 11, which is preferably a valve body 12 and an auger cartridge 14 removably connected thereto. It is to be understood that other various types of dispenser heads 11 would also be suitable for this invention. The liquid dispenser 10 further includes a drive shaft 16 connected to a drive motor 18, with a ball coupling 20 connected to the drive shaft 16 and a pump body coupling 22, (or drive coupling) connected to the ball coupling 20. A dispensing end of the auger cartridge 14 includes a dispensing tip 15 and a standoff 17. A supply 24 of liquid to be dispensed supplies liquid to a tube 26 which connects to a fitting 28, which preferably threads to the auger cartridge 14. The drive motor 18 and the liquid supply 24 are held in place via a bracket 30 and kept in spaced relation via a support 32.

A lever 34 mounts to the valve body 12 and engages the auger cartridge 14 to hold it in place therein. Movement of the lever 34 in the direction shown by directional arrows 36 enables the auger cartridge 14 to be connected to or disconnected from the valve body 12. A mount 38 is supported adjacent the valve body 12, and in a preferred embodiment includes a surface 39 which is parallel with the dispensing of the liquid dispenser 10. This surface 39 supports a linear bearing 40 operatively connected to the valve body, to confine axial movement of the valve body along a linear travel path of motion which is parallel to the surface 39 of the mounting 38 and the dispensing axis.

Figure 2:
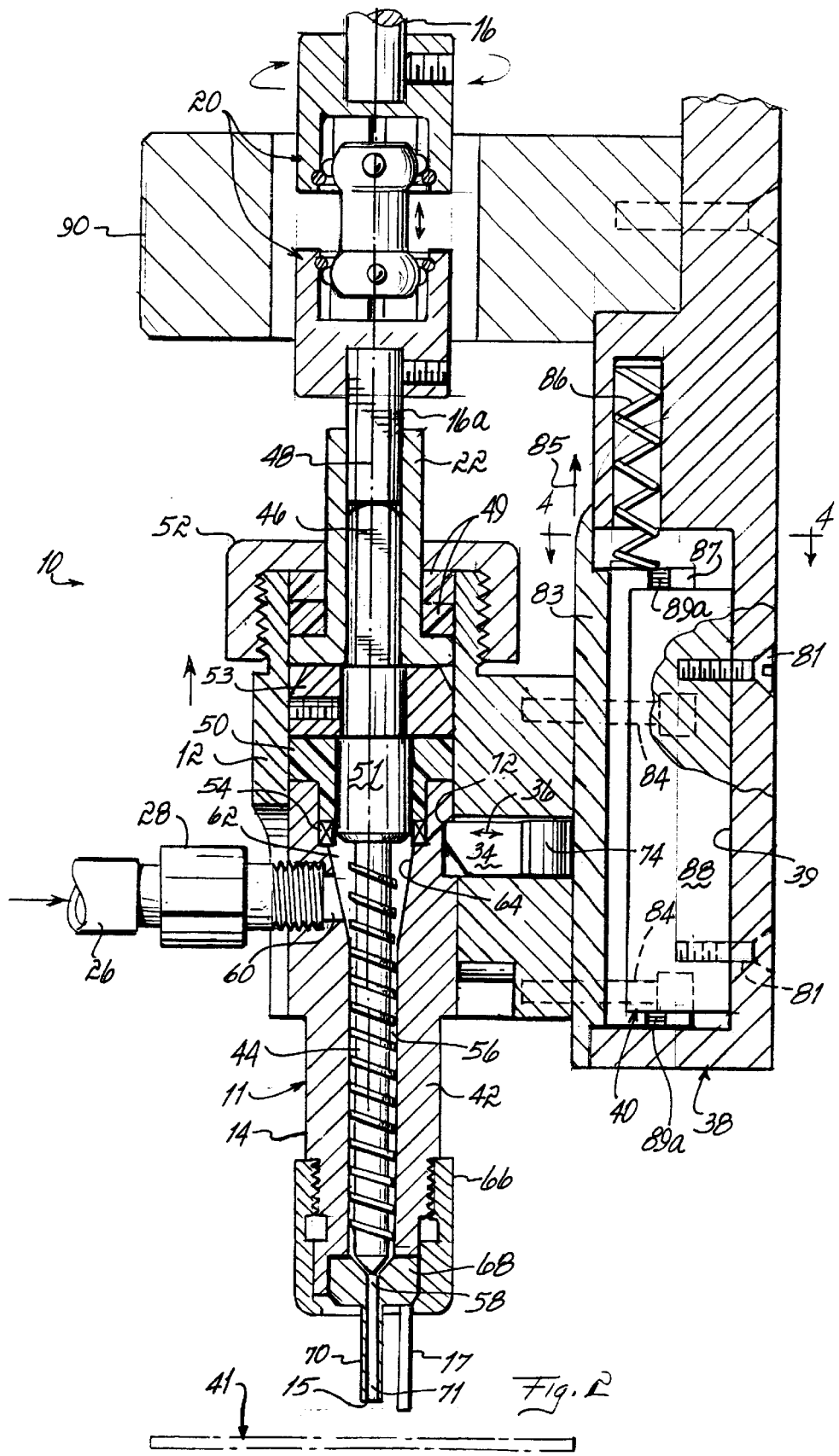
FIGS. 2 and 3 are axial cross-sectional views of the liquid dispenser of FIG. 1, taken along lines 2—2 of FIG. 1, showing the dispenser spaced from a substrate (FIG. 2) and in contact with a substrate (FIG. 3) to illustrate floating head operation, and variability in the axial dimension of the floating coupling and operation of the linear bearing.
Figure 3:
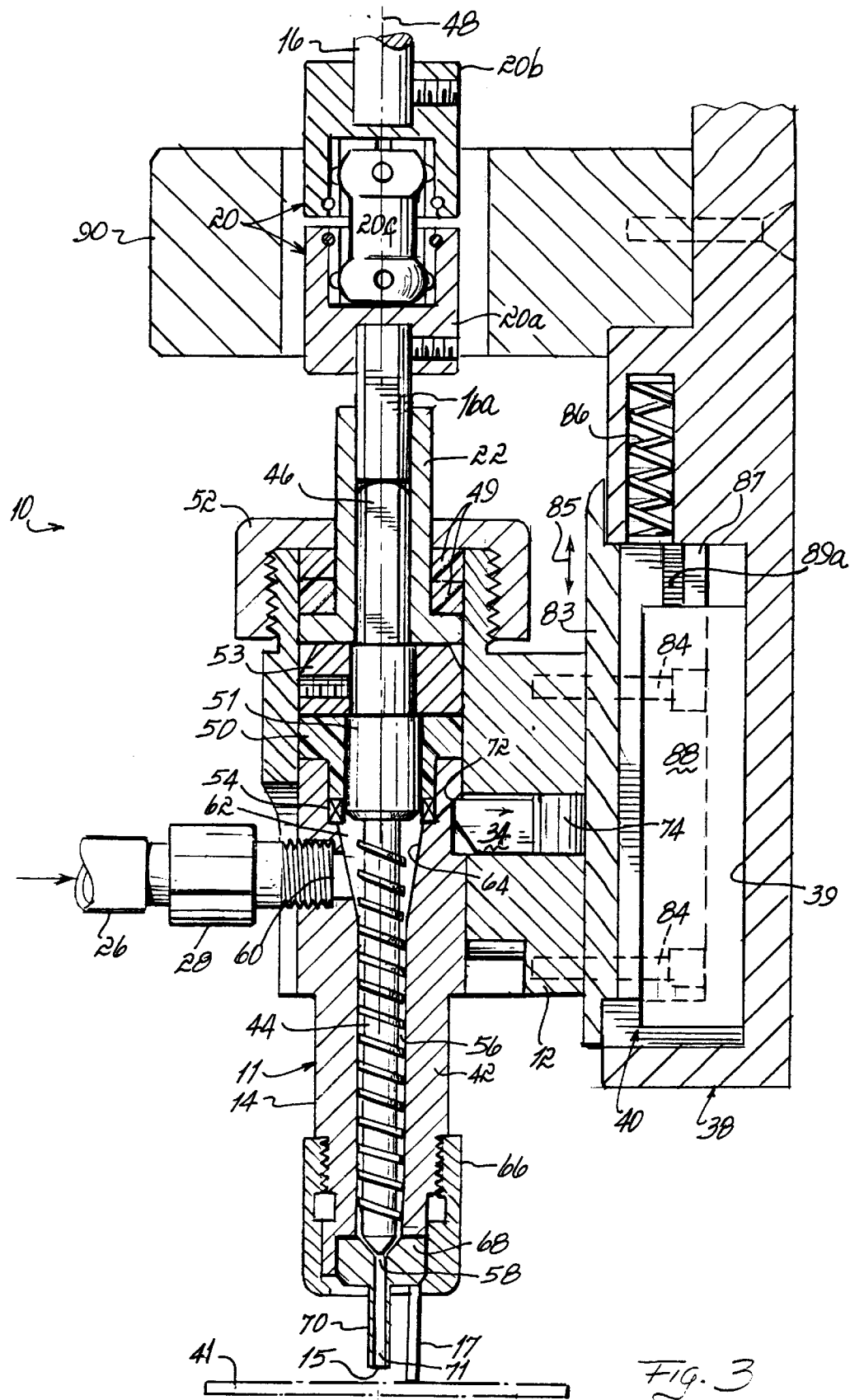

FIGS. 2 and 3 show, in more detail, axial cross-sectional views of the liquid dispenser 10 relative to a substrate 41 upon which liquid drops are deposited. In FIG. 2, the dispenser 10 is spaced from substrate 41, while FIG. 3 shows the dispenser 10 in contact with the substrate 41. More specifically, FIGS. 2 and 3 show that the auger cartridge 14 includes a housing 42 which is generally cylindrical in shape, and an auger 44 residing within the housing 42. A drive end, or coupled end 46, of the auger 44 operatively connects to the pump body coupling 22, or the drive coupling. The pump body coupling 22 is in the form of a bushing which, in transverse cross-section, has a hexagonally shaped internal passage sized to receive a corresponding hexagonal shape of the drive end 46 of the auger 44. The auger 44 resides along and rotates about the dispensing axis 48, which is the same axis as the drive shaft 16 of the drive motor 18. Preferably, the coupling 22 is held axially in place, relative to the valve body 12, by one or more bearings 49 residing within housing 42.

A thrust bearing 50 resides between the coupling 22 and an enlarged center portion 51 of the auger 44, with a collar 53 adjacent thereto. An end cap 52 threadably connects to the valve body 12 at the drive end 46 thereof, enclosing the bearing 49.

Inside the housing 42, opposite the thrust bearing 50, the enlarged portion 51 of the auger 44 is held in place by a cup seal 54. The cup seal 54 isolates an internal flowpath 56 of the housing 42 from pump components thereabove. More specifically, the flowpath 56 includes an outlet 58 and an inlet 60 which is typically oriented at a right angle relative to the dispensing axis 48 and the auger 44. The flowpath 56 also includes a transition portion 62 defined by angled interior walls 64 of the housing 42, resulting in the transition portion 62 being frustoconical in shape. The transition portion 62 includes an enlarged diameter portion at the drive end of the inlet 60 and a smaller diameter portion residing at the outlet end of the inlet 60. This shape, along with a uniform diameter of the auger 44 along its length, helps the auger 44 to pull the liquid toward the outlet during dispensing while minimizing sharp angles or pitch points that would otherwise exist if there were no clearance between the auger and the internal walls. In essence, the transition portion acts as an accumulator. Adjacent the outlet 58 the pump 10 includes an end cap 66, which preferably holds therein a collar 68 which has an opening defined by a nozzle 70, which terminates in an exit port 71 and the tip 15.

With reference to FIGS. 2 and 3, the lever 34 is movable in a plane perpendicular to the dispensing axis 48, to permit connection of the auger cartridge 14 to the valve body 12, or disconnection therefrom. When the auger cartridge 14 is connected to the valve body 12, the lever 34 engages a complementary shaped notch 72 formed in the housing 42. Preferably, the valve body 12 carries a leaf spring 74 which biases the lever 34 in a radially inward direction, toward the dispensing axis 48, to hold the auger cartridge 14 to the valve body 12 when it is connected thereto.

Also, when the auger cartridge 14 is connected to the valve body 12, the lever 34 holds the auger cartridge 14 to the valve body 12 in a fixed axial and radial position relative to the dispensing axis 48. This is particularly advantageous when the pump 10 is operated in a fixed head mode, because there is little or no axial movement between the drive end 46 of the auger 44 and the drive coupling 22 during use. Even if the pump 10 is to be used in a floating head mode, the drive end 46 of the auger 44 is still held in a fixed axial position relative to the drive coupling 22, via the bearing 49.

In this case, the axial play, or give, needed to accommodate "floating" and substrate 41 impact is provided by the ball coupling 20 and also by the linear bearing 40. As shown in FIGS. 2 and 3, the linear bearing 40 is secured to mount 38, and may be partially recessed therein. The linear bearing 40 bears against surface 39, which is parallel with the dispensing axis 48, and is connected thereto by bolts 81. The linear bearing 40 includes a cover plate 83 secured to valve body 12 via at least one bolt 84. The cover plate 83 and valve body 12 move parallel with the axis 48, as shown by directional arrows 85, and a spring 86 preferably biases the plate 83 in a downward position ("downward" with respect to FIGS. 2 and 3, but away from the motor 18 and toward the substrate 41, if not oriented vertically).

Figure 4:
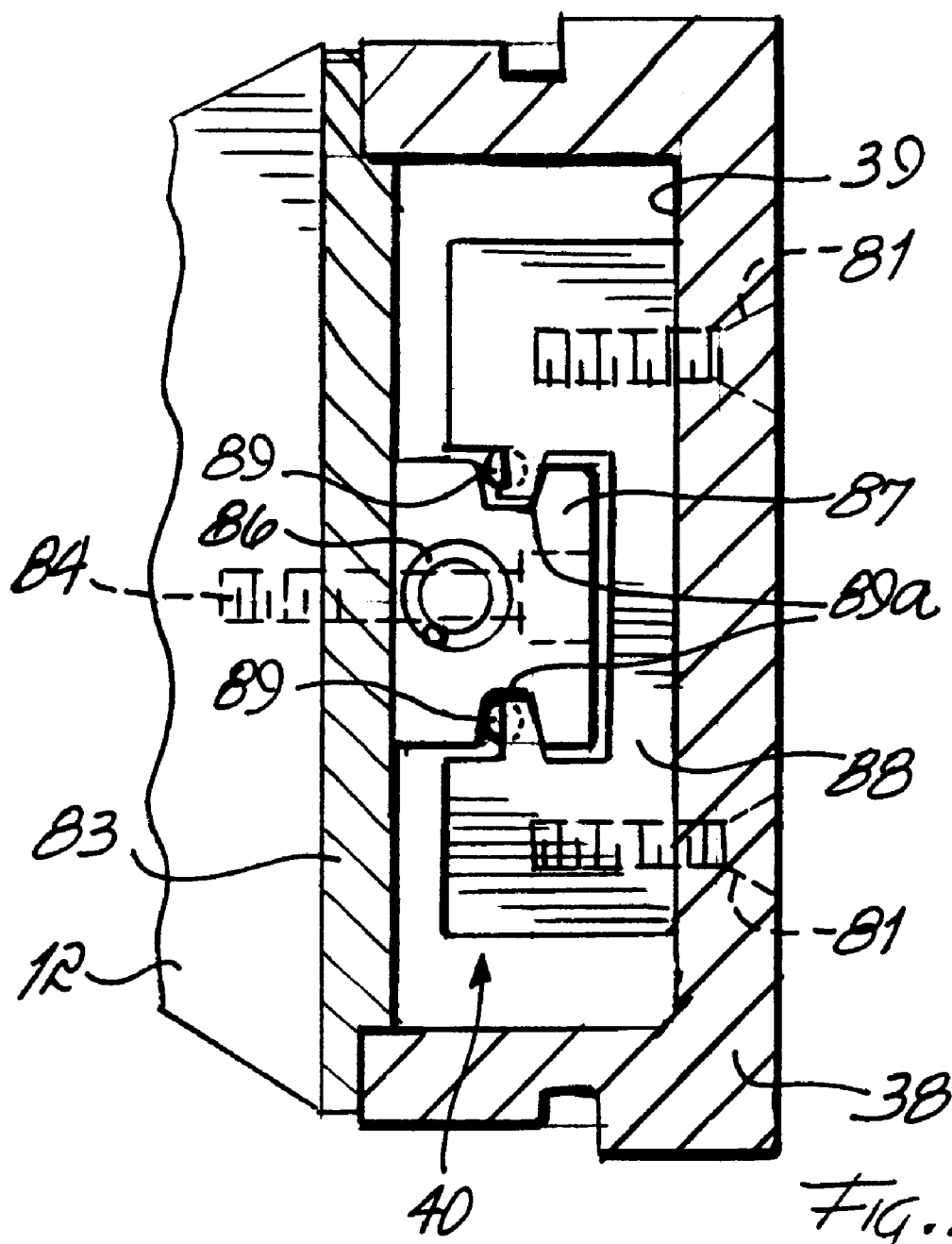
FIG. 4 is a cross-sectional view taken along lines 4—4 of FIG. 2.

FIG. 4 shows how valve body 12, plate 83 and internal bearing mount 87 move relative to a complementary shaped mount 88, with ball bearings 89 residing therebetween, within a raceway 89a, to accommodate relative linear movement. It has been found that a commercially available linear bearing 40 works well for this application, namely a linear bearing sold by THK and referred to as a "Miniature LM Guid Type RSH . . . Z with Retainer." Other similar linear bearings may also be suitable.

All of the components of the dispenser 10 which are carried by the mount 38 move with the mount 38 during floating head operation. The mount 38 is held by a frame (not shown). The linear bearing 40 enables the pump body 11 to move parallel with the axis 48 relative to the mount 38, to accommodate repeated impacts with the substrate 41 during dispensing.

The impact force is also absorbed by the ball coupling 20, which includes two spaced cylindrical housings 20a and 20b which are variable in axial spacing because of connector 20c. However, torque, or rotational force applied to one of the housings, for instance 20b, about the axis 48 results in rotation of housing 20b and a corresponding rotation of housing 20a, because the connector 20c directly couples the two housings 20a and 20b relative to rotational movement about axis 48. Housing 20b includes a recess to receivably hold the drive shaft 16, while housing 20a includes a recess for receivably holding a drive shaft extension 16a. Commercially available miniature ball couplings, for instance mini-joint shaft couplings made by GTC Falcon, Inc., have proven suitable.

Thus, when drive motor 18 rotates drive shaft 16, the rotational force is coupled to the auger 44 via housing 20b, connector 20c, housing 20a, drive shaft extension 16a and pump body coupling 22. This results in direct transmission of rotational force to auger 44, but with the auger 44 fixed axially relative to the pump body coupling 22. The ball coupling 20, i.e. the "floating" coupling, has variable axial dimension to move axially and to absorb impact when the standoff 17 repeatedly contacts the substrate 41 during liquid dispensing. Preferably, as shown in FIGS. 2 and 3, a support 90 extends laterally from mount 38 and surrounds the middle portion of the ball coupling. This support 90 helps protect the bearing surfaces of the components of the ball coupling 20 from dust, debris or dispensing liquid.

Figure 5:
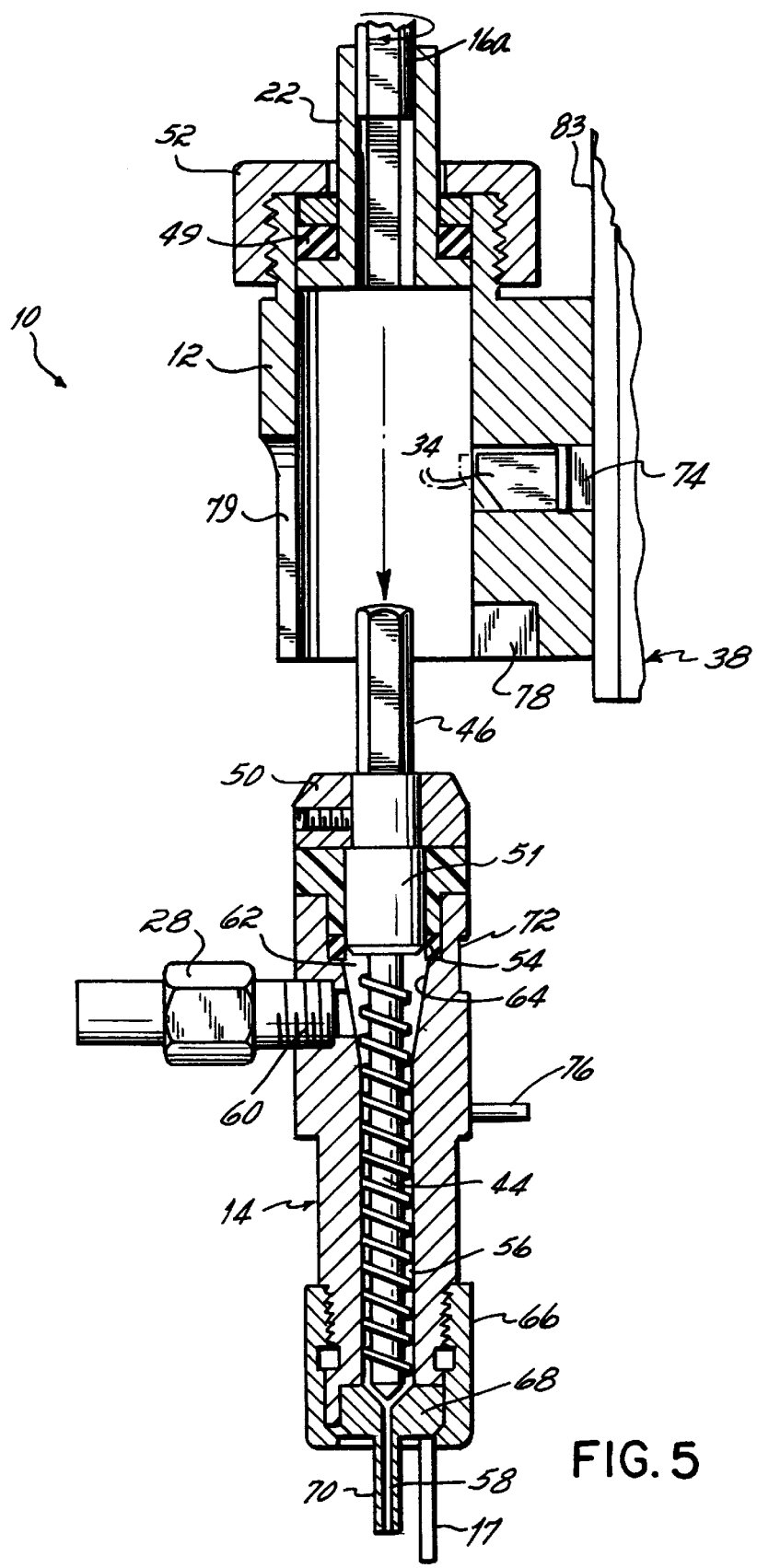
FIG. 5 shows the quick release feature for the removable auger cartridge.

In use, the auger cartridge 14 is moved within the valve body 12 by holding the lever 34 in a radially outward position, until the auger cartridge 14 seats in place within the valve body 12, whereupon the lever 34 is released and the spring 74 causes it to move radially inward to engage the notch 72 of the housing 42. FIG. 5 illustrates this movement. In this position, the drive end 46 of the auger 44 is received within drive coupling 22, so that rotational movement of the drive motor 18 will be coupled to the auger 44. Preferably, the housing 42 also includes a radially oriented extension 76 which is received within a complementary shaped recess 78 formed in the valve body 12. This helps to key, or align, the auger cartridge 14 in the correct rotational position relative to the axis 48 during connection. It also helps to align the fitting 28 within an arcuate cutout region 79 of the valve body 12.

As best shown in FIG. 5, when the auger cartridge 14 is connected to the valve body 12, the flowpath 56 resides entirely within the auger cartridge 14. Thus, all parts of the pump 10 which come in contact with the liquid being dispensed are removable, for easy cleaning, and the lever structure of the present invention facilitates connection and disconnection of the auger cartridge 14 from the valve body 12. Moreover, because of the incorporation of the frusto-conically shaped transition portion 62 within the flowpath 56, cleaning is also easier, because the pump 10 of this invention has less chance of internal clogging.

This transition portion 62 has its greatest transverse cross-sectional area at the drive end of the inlet and its smallest cross-sectional area downstream of the inlet 60. The auger 44 diameter remains constant along its length, so the transition portion 62 provides open volume between the threads of the auger 44 and the internal walls. This tends to pull the liquid into the threads, or flights, of the auger 44, thereby promoting control of liquid flow.

In "floating head" operation, the pump body 11 and the components it carries, including the auger 44, are axially movable relative to the mount 38 because of the linear bearing 40. At the same time, the ball coupling 20 also accommodates axial movement for the components along the axis 48, thereby eliminating the need for relative axial movement between the coupling 22 and the auger 44 during dispensing. This structure also reduces impact forces applied to the substrate 41.

While the present application describes a preferred embodiment of the invention, it is to be understood that variations may be made thereto without departing from the scope of the invention. For instance, those skilled in the art will appreciate that the particular structural details shown and described could be varied to achieve the same advantages. Therefore, the inventors do not intend this detailed description to be limiting relative to interpretation of the following claims, but rather exemplary of the presently preferred embodiment.

We claim:

1. A liquid dispenser comprising:

a drive motor having a drive shaft aligned along an axis;

a pump body, including an auger held in alignment along the axis within a liquid flowpath via a first coupling carried by the pump body, the flowpath terminating in an outlet; and a floating coupling residing between the drive motor and the pump body and operatively connecting the drive shaft to the first coupling, the floating coupling being variable in axial dimension to accommodate relative movement of the pump body along the axis relative to the drive motor.

2. The liquid dispenser of claim 1 wherein the floating coupling comprises:
a pair of axially spaced housings which move axially with respect to each other, thereby to accommodate different overall axial dimensions along the axis.

3. The liquid dispenser of claim 1 and further comprising;
a mount located adjacent the pump body and having a surface extending parallel to the axis; and
a linear bearing secured to the surface and operatively connected to the pump body, thereby to confine movement of the pump body along a linear path which is parallel to the axis.

4. The liquid dispenser of claim 1 wherein the flowpath includes an inlet portion oriented at a right angle relative to an outlet portion and relative to the auger, the housing further comprising angled internal walls defining a frustoconically shaped transition portion of the flowpath located adjacent the inlet portion.

5. The liquid dispenser of claim 4 wherein the transverse cross-sectional area of the transition portion is greatest at an end of the flowpath which is closest to the floating coupling and smallest at an opposite end thereof, and the auger has a uniform diameter along its length, thereby leaving an open volume between the auger and the angled internal walls at the transition portion.

6. The liquid dispenser of claim 1 wherein the pump body further comprises:
a body; and
an auger cartridge removably connected to the body, with the auger held by the first coupling when the auger cartridge is held to the body.

7. The liquid dispenser of claim 6 wherein the auger cartridge is fixed to the body axially and radially relative to the axis.

8. The liquid dispenser of claim 7 and further comprising:
a spring biased lever carried by one of the auger cartridge and the body and engaging the other of the auger cartridge and the body, thereby, to connect the auger cartridge to the body.

9. A liquid dispenser comprising:
a valve body;
a rotatable drive coupling located at one end of the valve body and rotatable relative to a dispensing axis;
an auger cartridge removably connected within the valve body, the auger cartridge including an auger and a housing, the housing having an axial flowpath aligned along the dispensing axis, the auger having a drive end operatively connected to the drive coupling when the housing is connected to the valve body, thereby to align the auger along the flowpath; and
one of the housing and the valve body having a lever and the other of the housing and the valve body having a cooperative notch engaged by the lever when the auger cartridge is connected to the valve body, thereby holding the housing and the valve body in a radial and axial fixed position relative to the dispensing axis, so that movement of the lever relative to the notch permits disconnection of the auger cartridge from the valve body.

10. The liquid dispenser of claim 9 wherein the notch is formed as part of the housing and the lever is carried by the valve body.

11. The liquid dispenser of claim 9 wherein the lever directly contacts the notch, thereby to hold the housing relative to the valve body.

12. The liquid dispenser of claim 9 wherein the lever is biased into engagement with the notch when the housing is connected to the valve body.

13. The liquid dispenser of claim 9 wherein the notch is integral with the housing.

14. The liquid dispenser of claim 9 further comprising:
a spring carried by the valve body and biasing the lever into engagement with the notch when the housing is connected to the valve body.

15. The liquid dispenser of claim 9 and further comprising:
a mount located adjacent the valve body and having a surface spaced from and parallel with the dispensing axis; and
a linear bearing operatively holding the valve body to the mount, thereby to confine movement of the valve body and the auger cartridge along a travel path which is parallel to and spaced laterally from the dispensing axis.

16. The liquid dispenser of claim 9 and further comprising:
a floating coupling operatively connected to the drive coupling and adapted to further connect to a motor drive shaft, the floating coupling being variable in axial dimension to accommodate relative movement of the drive coupling along the axis relative to the motor drive shaft.

17. The liquid dispenser of claim 9 wherein the flowpath of the housing includes an inlet portion oriented at a right angle relative to an outlet portion and relative to the auger, the housing further comprising angled internal walls defining a frustoconically shaped transition portion of the flowpath located adjacent the inlet portion.

18. The liquid dispenser of claim 17 wherein the transverse cross-sectional area of the transition portion is greatest at an end of the flowpath which is closest to the coupling and smallest at an opposite end thereof, and the auger has a uniform diameter along its length, thereby leaving an open volume between the auger and the angled internal walls at the transition portion.

19. A liquid dispenser comprising:
a valve body;
a rotatable drive coupling located at one end of the valve body and rotatable relative to a dispensing axis;
an auger cartridge removably connected within the valve body, the auger cartridge including an auger and a housing, the housing having an axial flowpath aligned along the dispensing axis, the auger having a drive end operatively connected to the drive coupling when the housing is connected to the valve body, thereby to align the auger along the flowpath; and
wherein the flowpath of the housing further includes an inlet portion oriented at an angle relative to an outlet portion and relative to the auger, the housing further comprising angled internal walls defining a frustoconically shaped transition portion of the flowpath located adjacent the inlet portion, wherein the transverse cross-sectional area of the transition portion is greatest at an end of the flowpath which is closest to the coupling and smallest at an opposite end thereof, and the auger has a uniform diameter along its length, thereby leaving an open volume between the auger and the angled internal walls at the transition portion.

20. The liquid dispenser of claim 19 and further comprising:
one of the housing and the valve body having a lever and the other of the housing and the valve body having a cooperative notch engaged by the lever when the auger cartridge is connected to the valve body, thereby holding the housing and the valve body in a radial and axial fixed position relative to the dispensing axis, so that movement of the lever relative to the notch permits disconnection of the auger cartridge from the valve body.

21. A liquid dispenser comprising:

a drive motor having a drive shaft aligned along an axis;

a pump body, including an auger held in alignment along the axis within a liquid flowpath via a first coupling carried by the pump body, the flowpath terminating in an outlet;

a floating coupling residing between the drive motor and the pump body and operatively connecting the drive shaft to the first coupling, the floating coupling being variable in axial dimension to accommodate relative axial movement of the pump body with respect to the drive motor;

a mount located adjacent the pump body and having a surface extending parallel to the axis;

a linear bearing secured to the surface and operatively connected to the pump body, thereby to confine movement of the pump body along a linear path which is parallel to and spaced laterally from the axis; and wherein the flowpath of the housing includes an inlet portion oriented at an angle relative to an outlet portion and relative to the auger, the housing further comprising angled internal walls defining a frustoconically shaped transition portion of the flowpath located adjacent the inlet portion.

22. The liquid dispenser of claim 21 wherein the pump body further comprises:

a body; and an auger cartridge removably connected to the body, with the auger held by the coupling when the auger cartridge is connected to the body to fix the auger cartridge to the body axially and radially relative to the axis.

23. The liquid dispenser of claim 21 wherein the transverse cross-sectional area of the transition portion is greatest at an end of the flowpath which is closest to the coupling and smallest at an opposite end thereof.

24. The liquid dispenser of claim 21 wherein the floating coupling comprises:

a pair of axially spaced housings which move axially with respect to each other to accommodate different overall axial dimensions along the axis.

25. The liquid dispenser of claim 24 and further comprising:

a support held by the mount and surrounding the floating coupling between the spaced housings.

* * * * *

UNITED STATES PATENT AND TRADEMARK OFFICE
CERTIFICATE OF CORRECTION

PATENT NO.    : 6,234,358 B1                                              Page 1 of 1
DATED         : May 22, 2001
INVENTOR(S)   : Michael J. Romine and Alan R. Lewis It is certified that error appears in the above-identified patent and that said Letters Patent is hereby corrected as shown below:

Column 6,
Lines 12 and 13, reads "to a substrate 41 upo n which liquid drops are" and should read -- to a substrate 41 upon which liquid drops are --.

Column 9,
Line 39, reads "and the body, thereby, to connect the auger" and should read -- and the body, thereby to connect the auger --.

Signed and Sealed this

First Day of April, 2003

JAMES E. ROGAN
*Director of the United States Patent and Trademark Office*